(12) United States Patent
Zhang et al.

(10) Patent No.: US 12,511,723 B2
(45) Date of Patent: Dec. 30, 2025

(54) SINGLE IMAGE DEHAZING METHOD BASED ON DETAIL RECOVERY

(71) Applicant: NANJING UNIVERSITY OF POSTS AND TELECOMMUNICATIONS, Nanjing (CN)

(72) Inventors: Dengyin Zhang, Nanjing (CN); Ying Zhang, Nanjing (CN); Yingying Feng, Nanjing (CN); Yu Qiu, Nanjing (CN)

( * ) Notice: Subject to any disclaimer, the term of this patent is extended or adjusted under 35 U.S.C. 154(b) by 280 days.

(21) Appl. No.: 18/495,569

(22) Filed: Oct. 26, 2023

(65) Prior Publication Data
US 2024/0289928 A1 Aug. 29, 2024

Related U.S. Application Data
(63) Continuation of application No. PCT/CN2023/122656, filed on Sep. 28, 2023.

(30) Foreign Application Priority Data
Feb. 28, 2023 (CN) .......................... 202310176162.X

(51) Int. Cl.
G06T 5/73 (2024.01)
(52) U.S. Cl.
CPC ...... *G06T 5/73* (2024.01); *G06T 2207/20081* (2013.01); *G06T 2207/20084* (2013.01)
(58) Field of Classification Search
CPC .............. G06T 5/73; G06T 2207/20081; G06T 2207/20084
USPC ........................................................ 382/255
See application file for complete search history.

(56) References Cited

U.S. PATENT DOCUMENTS 10,504,209 B2 * 12/2019 Chen .................... G06T 1/20

OTHER PUBLICATIONS

Li, Yan, et al. "Single image dehazing with an independent detail-recovery network." Knowledge-Based Systems 254 (2022): 109579. (Year: 2022).*
Kalra, Abhi, et al. "A new deep learning architecture for dehazing of aerial remote sensing images." Multimedia Tools and Applications 81.30 (2022): 43639-43655. (Year: 2022).*
Zhang, Wenbo, et al. "Dehazing network based on u-net structure and residual block." 2022 41st Chinese Control Conference (CCC). IEEE, 2022. (Year: 2022).*

* cited by examiner

*Primary Examiner* — Jonathan S Lee

(57) ABSTRACT

The present disclosure relates to the field of computer vision image dehazing and discloses a single image dehazing method based on detail recovery. The method includes step 1: constructing a training dataset; step 2: constructing a backbone dehazing network to achieve preliminary image dehazing: based on the U-Net network model, introduce a residual module based on pixel attention mechanism in the encoding region, and an feature enhancement module in the decoding area; step 3: constructing a detail recovery network for image detail recovery, and introducing residual shrinkage module and spatial attention mechanism; step 4: training an overall network model composed of the backbone dehazing network and the detail recovery network; step 5: Testing. The present disclosure can effectively remove fog while improving the problem of edge detail information loss, reducing the blurring of the edges of the dehazing image, and generating a higher-quality dehazing image.

5 Claims, 3 Drawing Sheets

SINGLE IMAGE DEHAZING METHOD BASED ON DETAIL RECOVERY

CROSS-REFERENCE TO RELATED APPLICATIONS

This application is a continuation of International Application No. PCT/CN2023/122656 with a filling date of Sep. 28, 2023, designating the United states, now pending, and further claims to the benefit of priority from Chinese Application No. 202310176162X with a filing date of Feb. 28, 2023. The content of the aforementioned applications, including any intervening amendments thereto, are incorporated herein by reference.

TECHNICAL FIELD

The present disclosure relates to the field of computer vision image dehazing, in particular to a single image dehazing method based on detail recovery.

BACKGROUND

The development of modern society is always accompanied by environmental pollution, and the occurrence of haze is becoming increasingly frequent, which greatly affects our lives. Haze is a common atmospheric phenomenon caused by small floating particles such as dust and smoke in the air. These floating particles greatly absorb and scatter light, resulting in negative visual effects such as blurred contrast, color distortion, and loss of image detail information in the captured images, which affects further image processing in the later stage.

From the perspective of image processing principles, dehazing algorithms can be divided into three categories: (1) image restoration based dehazing algorithms; (2) image enhancement based dehazing algorithms; and (3) deep learning based image dehazing algorithms. The algorithm based on image restoration mainly considers the imaging principle of fog, establishes an atmospheric scattering model by using scattering and attenuation of light to understand the physical mechanism of image degradation, thereby decomposing the dehazing image. However, prior knowledge is required as support, with a small scope of application and poor fog effect in scenes with significant interference. The algorithm based on image enhancement processes foggy images by using feature information from low brightness and low contrast of the image, but it can cause damage to the details and colors of the image, and the overall dehazing effect is average. With the rapid development of deep learning, obtaining fog free images based on deep learning algorithms has gradually become the mainstream. This algorithm mainly uses convolutional neural networks to establish a deep learning model, and uses the learning ability of the neural network to predict some parameters to achieve the goal of dehazing. Currently, there are two dehazing algorithms based on deep learning widely studied. One method is to use deep learning algorithms to predict some parameters of atmospheric physics models, thereby restoring fog free images. One method is to use neural networks to directly find the relationship between foggy images and clear images and establish a model for image restoration. For dehazing algorithms based on deep learning, although end-to-end algorithms can remove fog from foggy images to a certain extent, during the dehazing process, due to excessive focus on image dehazing, it is easy to remove some details from the original image together, lacking the ability to maintain the original details and texture information.

SUMMARY

In response to the problem that existing image dehazing algorithms based on deep learning are prone to overlook the restoration of image details, the present disclosure provides a single image dehazing method based on detail recovery, which includes a backbone dehazing network and a detail recovery network. The backbone dehazing network is used to restore the overall structure of foggy images, and the detail recovery network is used to improve the effect of image restoration details. Through the method of the present disclosure, while effectively removing fog, it can retain more image detail information, reduce the blurring at the edges of the defogged image, and generate higher-quality defogged images.

In order to achieve the above objectives, the present disclosure is achieved through the following technical solutions:

A single image dehazing method based on detail recovery is provided by the present disclosure. The single image dehazing method includes the following steps:

step 1, constructing a training dataset;

step 2, constructing a backbone dehazing network to achieve preliminary image dehazing: wherein the backbone dehazing network is constructed based on an U-Net structure, first using a large convolutional kernel of 7×7 in an encoding region, then passing through an improved residual module, and using a convolutional kernel of 3×3 and the improved residual module in sequence; first conducting up-sampling in a decoding region using a 3×3 deconvolution, then introducing a feature enhancement module, and then conducting up-sampling and feature enhancement in sequence;

step 3, constructing a detail recovery network for image detail recovery;

step 4, training an overall network model composed of the backbone dehazing network and the detail recovery network;

step 5, testing: inputting a fog image to be defogged into the overall network model trained in step 4, and a final output image is a defogged image.

As a further improvement of the present disclosure, in step 2, the improved residual module includes: passing input features through a basic residual block, and then adding global residual through a pixel attention mechanism as a whole.

As a further improvement of the present disclosure, each residual module includes a residual block and a pixel attention, and a structure of each residual block includes a convolutional layer, a ReLU activation layer, a convolutional layer, a global residual, and an expression of a feature $F^r$ after processing of the residual block is:

$$F^r = conv(\delta(convF)) + F \qquad (1)$$

wherein, conv denotes a convolution operation, and $\delta$ denotes a ReLU activation function;

an output feature of the residual block is put through one ReLU activation function first, then through two convolution layers and a sigmoid function to change into a 1×H×W output feature, and the 1×H×W output feature represents a weight information of each pixel point, namely:

$$PA = \sigma(conv(\delta(conv(F^*))))  \quad (2)$$

wherein, σ denotes the sigmoid function;
then, the input F* is multiplied with its corresponding pixel weights PA to achieve an assignment of different weights to different pixels, namely:

$$\tilde{F} = F^* \odot PA  \quad (3)$$

wherein, ⊙ denotes element-by-element multiplication;
finally, an output of the residual module is summed with its input and passed to a next layer.

As a further improvement of the present disclosure, an encoder in the encoding region is composed of 3 residual modules and 4 convolutional layers, and the 3 residual modules and the 4 convolutional layers are alternately connected; a decoder in the decoding region is composed of 3 feature enhancement modules, 3 deconvolution layers, and 1 convolutional layer, the 3 feature enhancement modules and the 3 deconvolution layer are alternately connected, and finally the 1 convolutional layer is connected for output; 7×7 convolutional kernels with a step size of 1 are used in a first convolutional layer of the encoder and a last convolutional layer of the decoder; and 3×3 convolutional kernels with a step size of 2 are used in all other convolutional layers and deconvolution layers of the backbone network.

As a further improvement of the present disclosure, in step 2, the feature enhancement module includes three residual blocks and a global residual, by adding a previous dehazing image to an input image with fog to enhance signals, dehazing an enhanced image, and subtracting the previous dehazing image from a restored signal enhancement result to obtain an image with better signal-to-noise ratio and better recovery features.

As a further improvement of the present disclosure, in step 3, the detail recovery network includes a residual block, a residual shrinkage module, and a spatial attention mechanism.

As a further improvement of the present disclosure, the residual shrinkage module includes two 3×3 convolutional layers, a global mean pooling layer, and a fully connected layer, inputting feature images into the two 3×3 convolutional layers, taking an absolute value of a result and then passing through the global mean pooling layer, then passing through the fully connected layer, multiplying a fully connected output by an input to obtain a soft threshold, and then adding into the global residual for output.

As a further improvement of the present disclosure, constructing the training dataset in step 1 includes: based on a pre-selected clear image database, conducting synthetic fog processing to a plurality of original clear images in the pre-selected clear image database through an atmospherical scattering model, so as to obtain clear fog-free images and synthetic fog images corresponding one-to-one before and after the processing as the training dataset. The advantageous effects of the present disclosure are as following:

1. The present disclosure introduces a residual module based on the pixel attention mechanism in the encoder of the backbone dehazing network. By assigning different weights to different pixels, it can better extract features and obtain more accurate feature images. At the same time, it can solve the problems of network degradation and gradient vanishing/exploding in deep networks.
2. The present disclosure introduces an feature enhancement module in the decoder of the backbone dehazing network, gradually refining the dehazing results by feeding the previously estimated enhancement as input.
3. The present disclosure introduces a residual shrinkage module and a spatial attention mechanism in the detail recovery network, which can better filter noise related features and solve the problem of spatial information preservation in the U-Net architecture. It also more targeted details recovery of defogged images, with better detail recovery effects.

The present disclosure compensates for the problem of easily neglecting the image detail restoration in deep learning based image dehazing method, and achieves good dehazing effects on both synthetic and natural fog images. Due to the detail recovery network, more detail information is retained in the dehazing image, reducing the blurring at the edges of the dehazing image.

DETAILED DESCRIPTION OF THE EMBODIMENTS

The embodiments of the present disclosure will be described below with the schema. For clarity, many practical details will be illustrated in the following description. However, it should be understood that these practical details should not regard as a limitation to the present disclosure. That is to say, in some embodiments of the present disclosure, these practical details are unnecessary. In addition, to simplify the schema, some commonly used structures and components will be depicted in a simple schematic manner in the schema.

Figure 6:
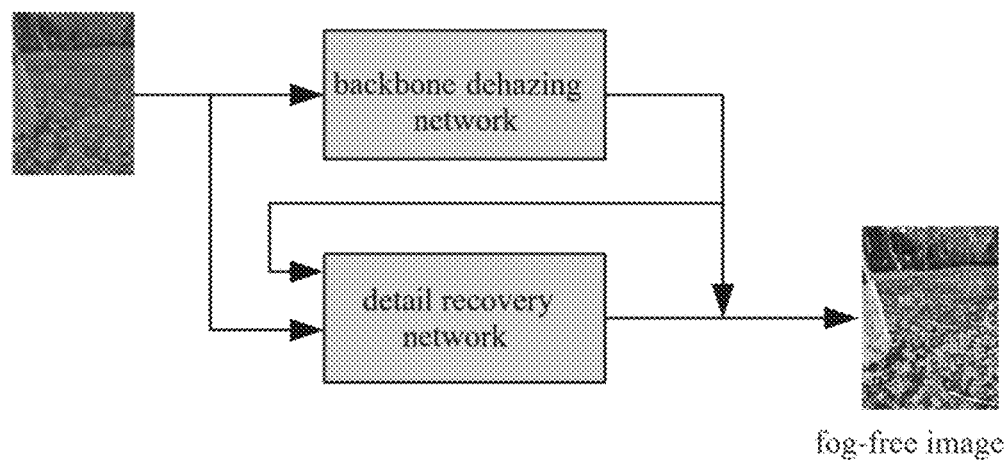
FIG. 6 is an overall network structure diagram of the present disclosure.

As shown in FIG. 6, a single image dehazing method based on detail recovery is provided by the present disclosure, and the single image dehazing method includes the following steps:

Step 1, constructing a training dataset: based on a pre-selected clear image database: conducting synthetic fog processing to a plurality of original clear images in the pre-selected clear image database through an atmospheric scattering model, so as to obtain clear fog-free images and synthetic fog images corresponding one-to-one before and after the processing as the training dataset.

Step 2, constructing a backbone dehazing network to achieve preliminary image dehazing.

Figure 1:
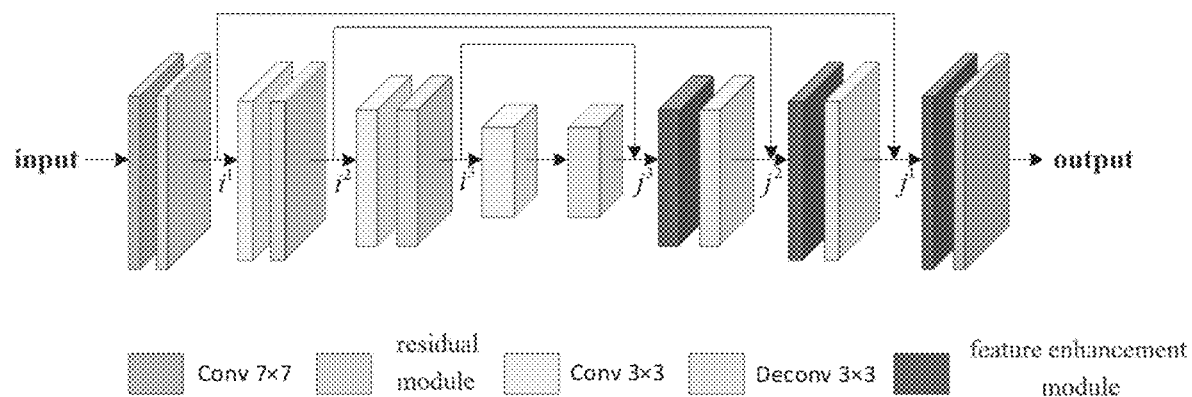
FIG. 1 is a structural diagram of the backbone dehazing network.

The backbone dehazing network is constructed based on an U-Net structure as shown in FIG. 1, an improved residual module is introduced in an encoding region, and a feature enhancement module is introduced in a decoding region. Specifically, the structure of the backbone dehazing network is constructed based on the U-Net structure, first using a 7×7 convolutional kernel in the encoding region, then passing through the improved residual module, and then using a 3×3 convolutional kernel and the improved residual module in sequence; first conducting up-sampling in the decoding region using a 3×3 deconvolution, then introducing the feature enhancement module, and then conducting up-sampling and feature enhancement in sequence.

Figure 2:
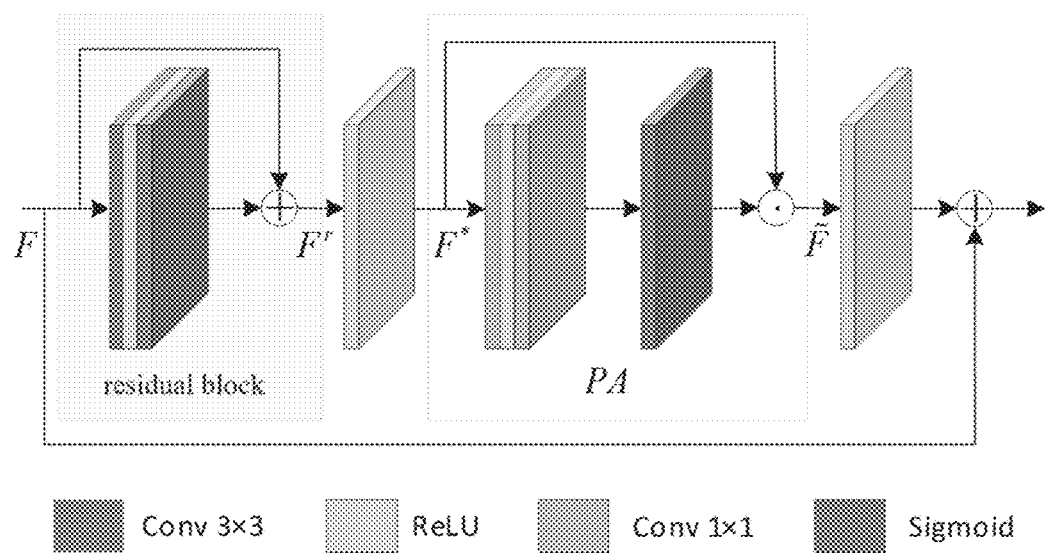
FIG. 2 is a structure diagram of the residual module in the backbone dehazing network.
Figure 3:
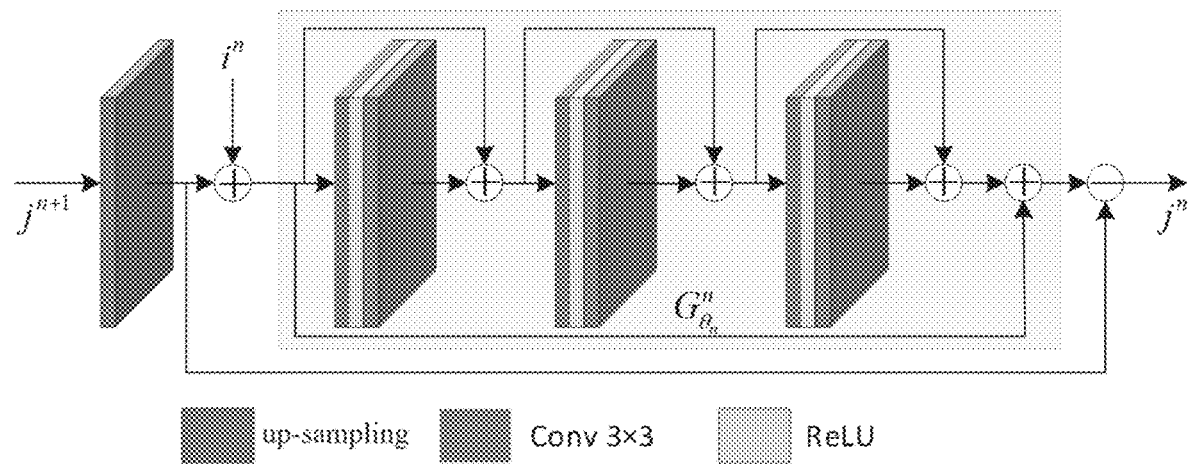
FIG. 3 is a structure diagram of the feature enhancement module in the backbone dehazing network.

As shown in FIG. 2, the improved residual module includes: passing input features through a basic residual block, which are then adding global residual as a whole through a pixel attention mechanism. By combining the pixel attention mechanism to assign different weights to different pixels, the more interested pixels get more attention for better feature extraction. As shown in FIG. 3, the introduced feature enhancement module includes three residual blocks and one global residual, by adding a previous dehazing image to an input image with fog to enhance signals, dehazing the enhanced image, and subtracting the previous dehazing image from a restored signal enhancement result to obtain an image with better signal-to-noise ratio and better recovery features, and there is also a skip connection between the encoding region and the decoding region. The encoder in the encoding region is composed of 3 residual modules and 4 convolutional layers, and the residual modules and the convolutional layers are alternately connected. The decoder in the decoding region is composed of 3 feature enhancement modules, 3 deconvolution layers, and 1 convolutional layer, the 3 feature enhancement modules and the 3 deconvolution layer are alternately connected, and finally the 1 convolutional layer is connected for output. 7×7 convolutional kernels with a step size of 1 are used in the first convolutional layer of the encoder and the last convolutional layer of the decoder. And 3×3 convolutional kernels with a step size of 2 are used in all other convolutional layers and deconvolution layers of the backbone network.

Step 3, constructing a detail recovery network for image detail recovery.

Figure 4:
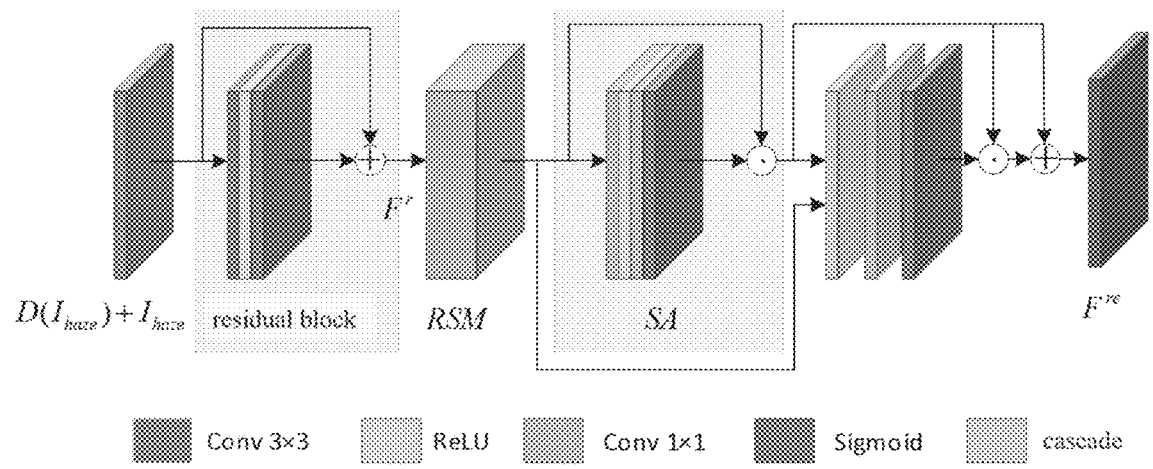
FIG. 4 is a structural diagram of the detail recovery network.
Figure 5:
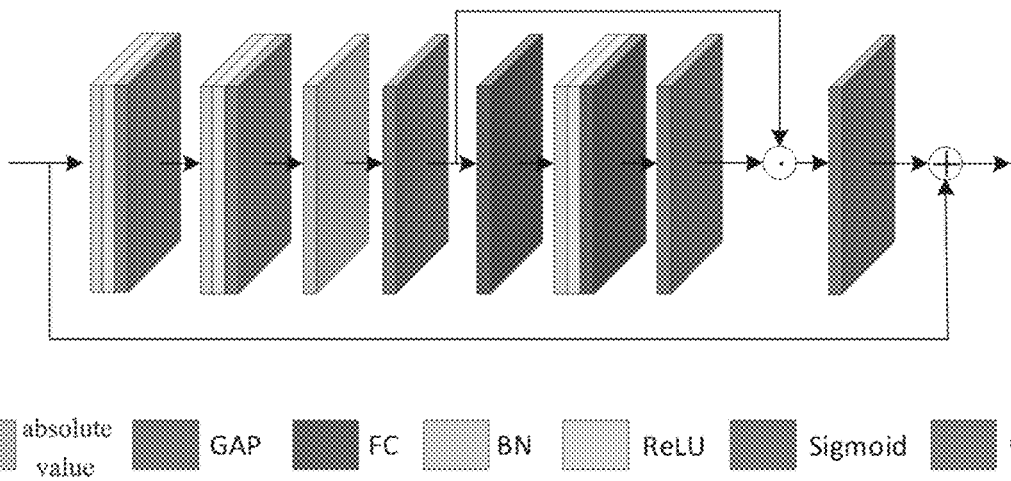
FIG. 5 is a structure diagram of the residual shrinkage module in the detail recovery network.

As shown in FIG. 4, the detail recovery network includes a residual block, a residual shrinkage module, and a spatial attention mechanism, wherein the introduced residual shrinkage module is shown as FIG. 5, the residual shrinkage module includes two 3×3 convolutional layers, a global mean pooling layer, and a fully connected layer, inputting feature images into the two 3×3 convolutional layers, taking an absolute value of a result and then passing through the global mean pooling layer, then passing through the fully connected layer, multiplying a fully connected output by an input to obtain a soft threshold, and then adding into the global residual for output.

Specifically: after two convolutions of the input features, the residual shrinkage module takes the absolute values of all the features of the feature image, which are then pooled and averaged with the global mean to obtain a feature A. In another path, the feature image after global mean pooling is input to a small fully connected network that takes the Sigmoid function as the last layer, then the output is normalized to between 0 and 1 to obtain a coefficient $\alpha$, such that the final threshold can be expressed as A×$\alpha$. Different thresholds for different samples allow features that are not relevant to the current task to be set to zero by soft thresholding, and features that are relevant to the current task to be kept. Cascading the output of the residual shrinkage model with that of the spatial attention mechanism, and then inputting it into a convolution layer, making it possible to focus not only on information in the channel dimension and spatial dimension, but also to combine the two modules to obtain joint attention weights, and to obtain enhanced features that can effectively complement the information missed when using the residual shrinkage module or the spatial attention alone, or both in tandem.

Introducing "soft thresholding" as a "shrinkage layer" into the residual module and adaptively setting thresholds, so that each channel in the feature image corresponds to a shrinkage threshold can better filter noise related features. Introducing spatial attention mechanism to solve the problem of preserving spatial information in the U-Net architecture can better restore the detailed and structural features of images.

Step 4, training an overall network model composed of the backbone dehazing network and the detail recovery network;

The overall network structure of the present disclosure is shown in FIG. 6. For each set of samples, the foggy image obtained in Step 1 is used as an input to the backbone dehazing network, and the preliminary fog-free image is used as an output, which is trained by the backbone dehazing network constructed in Step 2. The preliminary dehazing image and the foggy image obtained in Step 1 are cascaded into the detail recovery network to obtain the final dehazing image, which is trained by the detail recovery network constructed in Step 3. In the training process, the loss function is used to calculate the loss, and the network parameters are iteratively updated to obtain an optimized dehazing model for image dehazing.

Step 5, testing: inputting a fog image to be defogged into the overall network model trained in Step 4, and a final output image is the defogged image. For example, the dehazing effect can be tested first on a synthetic fog image, and then further verified on a natural fog image. The evaluation indicators are peak signal to noise ratio (PSNR) and structural similarity (SSIM).

The present embodiment uses the RESIDE dataset to synthesise a foggy dataset based on an atmospheric scattering model with atmospheric light set to 1 and scattering coefficients taken randomly in the interval [0,0.1].

As shown in FIG. 1, each layer of features in the encoding phase of the backbone dehazing network can be regarded as an input, and each layer of features in the decoding phase is regarded as an output, so that the up-sampled result of each layer in the decoding phase is regarded as the solution of the next iteration of the current feature, and then the enhancement strategy of denoising step-by-step solution is used. And the enhancement strategy formula is unified, that is, the current input is added to the result of the last output, and then used as the input for the next time.

In neural networks, shallower networks may have the problem of gradient vanishing or gradient exploding during the training process, and the present disclosure adopts the residual module design to effectively alleviate this phenomenon. At the same time, the distribution of haze on different image pixels is not uniform, so a pixel attention mechanism is introduced into the residual module to make the network pay more attention to the information features.

As shown in FIG. 2, each residual module includes a residual block and a pixel attention, and a structure of each residual block includes a convolutional layer, a ReLU activation layer, a convolutional layer, a global residual, and the expression of a feature $F^r$ after processing of the residual block is:

$$F^r = conv(\delta(convF)) + F \qquad (1)$$

Wherein, conv denotes a convolution operation, and $\delta$ denotes a ReLU activation function.

An output feature of the residual block is put through one ReLU activation function first, then through two convolution layers and a sigmoid function to change into a 1×H×W output feature, and the 1×H×W output feature represents the weight information of each pixel point, namely:

$$PA = \sigma(conv(\delta(conv(F^*)))) \qquad (2)$$

Wherein, $\sigma$ denotes the sigmoid function.

Then, the input $F^*$ is multiplied with its corresponding pixel weights PA to achieve the assignment of different weights to different pixels, namely:

$$\tilde{F} = F^* \odot PA \qquad (3)$$

Wherein, $\odot$ denotes element-by-element multiplication.

Finally, the output of the residual module is summed with its input and passed to the next layer. This design facilitates feature extraction and gradient feedback.

For image dehazing, the enhancement strategy can be shown in equation (4) below:

$$J^{n+1} = g(I + J^n) - J^n \qquad (4)$$

Wherein, $J^n$ denotes the prediction result at the n-th iteration, g(•) is the dehazing operation, and (I+J$^n$) denotes the use of foggy image input/to enhance J$^n$ By using the above equation, the image dehazing performance can be improved to achieve better dehazing results.

As shown in FIG. 3, in the feature enhancement module of the n-th level of the decoder, the present disclosure up-samples the features j$^{n+1}$ of the previous level so that their size is the same as the output of the residual module of the corresponding coding layer, and then the up-sampling result is added with the output i$^n$ of the residual module of the corresponding coding layer, i.e., using the latent features i$^n$ in the encoder for enhancement, then passing it to the refinement unit $G_{\theta_n}^n$, and the result is subtracted from j$^{n+1}$ after the up-sampling to get the output of the final feature enhancement module of the n-th level, namely j$^n$. Wherein the network architecture of $G_{\theta_n}^n$(•) function is comprised of three residual blocks and one global residual, and the equation of the feature enhancement module is shown in equation (5) below:

$$j^n = G_{\theta_n}^n(i^n + (j^{n+1})\uparrow_2) - (j^{n+1})\uparrow_2 \qquad (5)$$

Wherein, $\uparrow_2$ denotes a 2× up-sampling operation, (i$^n$+ (j$^{n+1}$)$\uparrow_2$) denotes an augmented feature, and $G_{\theta_n}^n$ denotes a n-th layer trainable refinement unit with a parameter of $\theta$.

As shown in FIG. 4, the detail recovery network introduces a residual shrinkage module into the network. By introducing "soft thresholding" as a "shrinkage layer" into the residual module and setting the thresholds adaptively, so that each channel of the feature image corresponds to a shrinkage threshold, which can better filter noise-related features. By introducing spatial attention mechanism, it solves the problem of spatial information retention in U-Net architecture. It not only pays attention to the information in the channel dimension and the spatial dimension at the same time, but also combines the two modules to obtain the joint attention weights. The features enhanced with the joint weights can effectively complement the information missed when using the residual contraction module or spatial attention alone, or both in tandem.

The preliminary defogged image and the original foggy image cascade as inputs to the detail recovery network, processing through a residual block to obtained F$^r$, then F$^r$ is processed through a residual shrinkage module to obtained F$^{RS}$, and then F$^{RS}$ is processed through spatial attention to obtained F$^{SA}$. The F$^{RS}$ and F$^{SA}$ can be expressed in equation (6) and equation (7):

$$F^{RS} = RS(F^r) \qquad (6)$$

$$F^{SA} = SA(F^{RS}) \qquad (7)$$

Wherein RS(•) and SA(•) denote the residual shrinkage module and the spatial attention, respectively, in order to supplement the information lost during the feature extraction process of the spatial attention and the residual contraction module, the information of the channel dimension and spatial dimension is jointly processed to obtain the output F$^{re}$ of the detail recovery network, which can be expressed in equation (8):

$$F^{re} = \sigma(conv(cat(F^{RS}, F^{SA}))) \odot F^{SA} + F^{SA} \qquad (8)$$

Wherein, $\sigma$(•) denotes the Sigmoid activation function, cat denotes the splice operation, and $\odot$ denotes the multiplication of the corresponding elements.

In order to enable the network to learn the mapping relationship between the foggy image and the corresponding clear image, and to prompt the backbone dehazing network to generate a clearer preliminary defogged image, the backbone dehazing network is trained by using the mean square error loss function, as shown in equation (9).

$$L_{MSE} = \frac{1}{N}\sum_{i=1}^{N}(I_{gt}^i - D(I_{haze}^i))^2 \qquad (9)$$

Wherein, N denotes the number of samples trained, $I_{gt}$ denotes a real fog-free image, $I_{hase}$ denotes a foggy image, and D(•) denotes a backbone dehazing network.

Negative structural similarity loss function is used to train the detail recovery network, structural similarity is used to measure the degree of structural similarity between two images, negative structural similarity loss is used to reduce the gap between the output image and the real image in terms of structural similarity, the specific equation is shown in equation (10):

$$L_{SSIM} = 1 - SSIM(I_{gt}, R(I_{haze}, I_{de})) \quad (10)$$

Wherein, SSIM(•) denotes the structural similarity of the two images, R(•) denotes the detail recovery network, and $I_{de}$ denotes the initial defogged image obtained through the backbone dehazing network. The detail recovery image obtained through the detail recovery network is denoted by $I_{re}$.

A single image dehazing method based on detail recovery of the present disclosure not only focuses on the overall dehazing of the image, but also on the restoration of information about the details of the foggy image. This method compensates for the problem of easily removing certain details from the original image in existing dehazing algorithms, and can retain more image details, reduce the blurring at the edges of the dehazing image, and generate a high-quality dehazing image.

The above is only an embodiment of the present disclosure and is not intended to limit it. For those skilled in the art, the present disclosure can undergo various modifications and variations. Any modifications, equivalent substitutions, improvements, etc. made within the spirit and principles of the present disclosure shall be included within the scope of the claims of the present disclosure.

What is claimed is:

1. A single image dehazing method based on detail recovery, characterized in that the single image dehazing method comprises the following steps:

step 1, constructing a training dataset;

step 2, constructing a backbone dehazing network to achieve preliminary image dehazing:

wherein the backbone dehazing network is constructed based on an U-Net structure, first using a 7×7 convolutional kernel in an encoding region, then passing through an improved residual module, and using a 3×3 convolutional kernel and the improved residual module in sequence;

first conducting up-sampling in a decoding region using a 3×3 deconvolution, then introducing a feature enhancement module, and then conducting up-sampling and feature enhancement in sequence;

step 3, constructing a detail recovery network for image detail recovery:

step 4, training an overall network model composed of the backbone dehazing network and the detail recovery network;

step 5, testing: inputting a fog image to be defogged into the overall network model trained in step 4, and a final output image is a defogged image;

wherein in step 2, the improved residual module comprises: passing input features through a basic residual block, and then adding global residual through a pixel attention mechanism as a whole;

wherein each residual module comprises a residual block and a pixel attention, and a structure of each residual block comprises a convolutional layer, a ReLU activation layer, a convolutional layer, a global residual, and an expression of a feature F' after processing of the residual block is:

$$F^r = conv(\delta(convF)) + F \quad (1)$$

wherein, conv denotes a convolution operation, and $\delta$ denotes a ReLU activation function;

an output feature of the residual block is put through one ReLU activation function first, then through two convolution layers and a sigmoid function to change into a 1×H×W output feature, and the 1×H×W output feature represents a weight information of each pixel point, namely:

$$PA = \sigma(conv(\delta(conv(F^*)))) \quad (2)$$

wherein, $\sigma$ denotes the sigmoid function;

then, the input F* is multiplied with its corresponding pixel weights PA to achieve an assignment of different weights to different pixels, namely:

$$\tilde{F} = F^* \square PA \quad (3)$$

wherein, □ denotes element-by-element multiplication;

finally, an output of the residual module is summed with its input and passed to a next layer;

wherein an encoder in the encoding region is composed of 3 residual modules and 4convolutional layers, and the 3 residual modules and the 4 convolutional layers are alternately connected; a decoder in the decoding region is composed of 3 feature enhancement modules, 3 deconvolution layers, and 1 convolutional layer, the 3 feature enhancement modules and the 3 deconvolution layer are alternately connected, and finally the 1 convolutional layer is connected for output; 7×7 convolutional kernels with a step size of 1 are used in a first convolutional layer of the encoder and a last convolutional layer of the decoder; and 3×3 convolutional kernels with a step size of 2 are used in all other convolutional layers and deconvolution layers of the backbone network.

2. The single image dehazing method based on detail recovery according to claim 1, wherein in step 2, the feature enhancement module comprises three residual blocks and a global residual, by adding a previous dehazing image to an input image with fog to enhance signals, dehazing an enhanced image, and subtracting the previous dehazing image from a restored signal enhancement result to obtain an image with better signal-to-noise ratio and better recovery features.

3. The single image dehazing method based on detail recovery according to claim 2, wherein in step 3, the detail recovery network comprises a residual block, a residual shrinkage module, and a spatial attention mechanism.

4. The single image dehazing method based on detail recovery according to claim 3, wherein the residual shrinkage module comprises two 3×3 convolutional layers, a global mean pooling layer, and a fully connected layer, inputting feature images into the two 3×3 convolutional layers, taking an absolute value of a result and then passing through the global mean pooling layer, then passing through the fully connected layer, multiplying a fully connected output by an input to obtain a soft threshold, and then adding into the global residual for output.

5. The single image dehazing method based on detail recovery according to claim 1, wherein constructing the training dataset in step 1 comprises: based on a pre-selected clear image database, conducting synthetic fog processing to a plurality of original clear images in the pre-selected clear image database through an atmospherical scattering model, so as to obtain clear fog-free images and synthetic fog images corresponding one-to-one before and after the processing as the training dataset.

* * * * *